(12) United States Patent
Newport et al.

(10) Patent No.: US 7,870,419 B2
(45) Date of Patent: *Jan. 11, 2011

(54) SUBSCRIPTION-BASED MANAGEMENT AND DISTRIBUTION OF MEMBER-SPECIFIC STATE DATA IN A DISTRIBUTED COMPUTING SYSTEM

(75) Inventors: William T. Newport, Rochester, MN (US); James W. Stopyro, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 441 days.

This patent is subject to a terminal disclaimer.

(21) Appl. No.: 12/104,150

(22) Filed: Apr. 16, 2008

(65) Prior Publication Data
US 2008/0195689 A1 Aug. 14, 2008

Related U.S. Application Data

(63) Continuation of application No. 10/932,712, filed on Sep. 2, 2004, now Pat. No. 7,386,753.

(51) Int. Cl.
G06F 11/00 (2006.01)
(52) U.S. Cl. .............................. 714/4; 714/49; 709/221
(58) Field of Classification Search .................... 714/4, 714/49; 709/221
See application file for complete search history.

(56) References Cited

U.S. PATENT DOCUMENTS

| 6,014,669 | A | 1/2000 | Slaughter et al. |
| 6,108,699 | A | 8/2000 | Moiin |
| 6,279,032 | B1 | 8/2001 | Short et al. |
| 6,314,526 | B1 | 11/2001 | Arendt et al. |
| 6,453,426 | B1 | 9/2002 | Gamache et al. |
| 6,839,752 | B1 | 1/2005 | Miller et al. |
| 6,847,993 | B1 | 1/2005 | Novaes et al. |
| 6,892,316 | B2 | 5/2005 | Eide et al. |
| 7,231,461 | B2 | 6/2007 | Laschkewitsch et al. |
| 7,386,753 | B2 | 6/2008 | Newport et al. |
| 7,774,639 | B2* | 8/2010 | Newport et al. ............. 714/4 |
| 2002/0133594 | A1 | 9/2002 | Syvanne |
| 2003/0088659 | A1 | 5/2003 | Susarla et al. |
| 2003/0167331 | A1 | 9/2003 | Kumar et al. |

OTHER PUBLICATIONS

US Patent and Trademark Office, Office Action issued in related U.S. Appl. No. 10/932,712 dated Oct. 2, 2007.
US Patent and Trademark Office, Notice of Allowance issued in related U.S. Appl. No. 10/932,712 dated Apr. 1, 2008.
US Patent and Trademark Office, Office Action issued in related U.S. Appl. No. 12/104,162 dated Oct. 2, 2009.

* cited by examiner

Primary Examiner—Philip Guyton
(74) Attorney, Agent, or Firm—Wood, Herron & Evans, LLP

(57) ABSTRACT

An apparatus utilizes distributed coordinating members to distribute member-specific state data to subscribing members in a distributed computing system. Member-specific state data is associated with different subjects, and coordinating members are configured to manage state data associated with particular subjects such that a reporting member that needs to report member-specific state data associated with a particular subject forwards that state data to a coordinating member associated with that subject. Once received, the coordinating member then distributes the member-specific state data to any members that have subscribed to receive state data associated with that subject.

12 Claims, 5 Drawing Sheets

US 7,870,419 B2

SUBSCRIPTION-BASED MANAGEMENT AND DISTRIBUTION OF MEMBER-SPECIFIC STATE DATA IN A DISTRIBUTED COMPUTING SYSTEM

CROSS-REFERENCE TO RELATED APPLICATIONS

This application is a continuation of U.S. patent application Ser. No. 10/932,712, filed on Sep. 2, 2004, now U.S. Pat. No. 7,386,753 by William T. Newport et al. (ROC920040231US1). In addition, this application is related to U.S. patent application Ser. No. 12/104,162, filed on Apr. 16, 2008 by William T. Newport et al. (ROC920040231US3), which is also a continuation of the aforementioned '712 application. The entire disclosures of both applications are incorporated by reference herein.

FIELD OF THE INVENTION

The invention is generally directed to distributed computing systems, and in particular, to the management of state data in distributed computing systems.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

An important feature often required in clusters as well as other distributed computing systems is the distribution of state data among the various computing devices participating in the system. In a clustered computing system, for example, each node or member typically has locally-generated data that contributes to the overall "state" of the cluster. Much of this state data is specific to the member, but can be utilized by other members (which may include other nodes of the cluster and/or any clients that attempt to access the cluster).

The member-specific state data may related to practically any information that contributes to the overall state of the distributed computing system. For example, the state data may be performance-related, e.g., in terms of current processing throughput, load level, communications throughput. The state data may also be configuration- or capability-related, e.g., in terms of available services, available connections, endpoint configuration data, supported protocols.

In some instances, member-specific state data may be relatively static, and may not change significantly over time. Other member-specific state data may be relatively dynamic, and may only be interesting or useful as long as the member is active in the system. For example, performance-related member-specific state data may be used by a load balancing algorithm to determine the relative workloads of multiple nodes in a cluster, and thus enable tasks to be routed to individual nodes to efficiently balance the overall workload among the nodes.

Timely and reliable distribution of member-specific state data is often required to ensure reliable operation of a distributed computing system. Traditionally, such distribution has been handled by collecting the member-specific state data in a central location, e.g., in a single computing device in a distributed computing system. Individual members report their respective member-specific state data to the single computing system, and members that desire to receive such state data are permitted to "subscribe" to receive such state data. Changes to the state data reported by a particular member are then automatically distributed to any members that are subscribed to receive such changes. The single computing device that distributes the state data is then required to monitor all of the other members, and to update any state data and subscriptions if any of the members fail and become inaccessible.

The use of a single computing device, however, represents a single point of failure, which is often undesirable, particularly in high availability environments. In addition, a single computing device may present a scaling problem as the amount of state shared increases.

As such, a significant need has existed for a more reliable and scalable manner of managing and distributing member-specific state data among multiple members in a distributed computing system.

SUMMARY OF THE INVENTION

The invention addresses these and other problems associated with the prior art in providing an apparatus that utilizes multiple, distributed coordinating members to distribute member-specific state data to subscribing members in a distributed computing system. Member-specific state data is associated with different subjects, and coordinating members are configured to manage state data associated with particular subjects such that a reporting member that needs to report member-specific state data associated with a particular subject forwards that state data to a coordinating member associated with that subject. Once received, the coordinating member then distributes the member-specific state data to any members that have subscribed to receive state data associated with that subject.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter facilitate the management and distribution of member-specific state data to a plurality of members in a distributed computing system. The member-specific state data for each member is typically categorized by and associated with one or more of a plurality of defined "subjects". Collectively, the member-specific state data for the plurality of members defines a global state for the distributed computing system representing the overall state of the system at a particular point in time.

The types of state data and subjects by which to characterize such state data are innumerable, and can relate to practically any type of data that may be desirably maintained in a distributed computing system, including, for example, configuration and capability data, performance data, live system state data, etc. For example, in the embodiment discussed in greater detail below, the member-specific state data can relate to manage, among other data, routing table states and performance metrics in an enterprise computing platform such as the WebSphere platform from International Business Machines Corporation. Other types of state data may be used, for example, to advertise member capabilities, to advertise supported protocols, services, endpoints and/or connections, or to report current performance metrics (e.g., transactions/second) to use in a distributed load balancing protocol.

Figure 1:
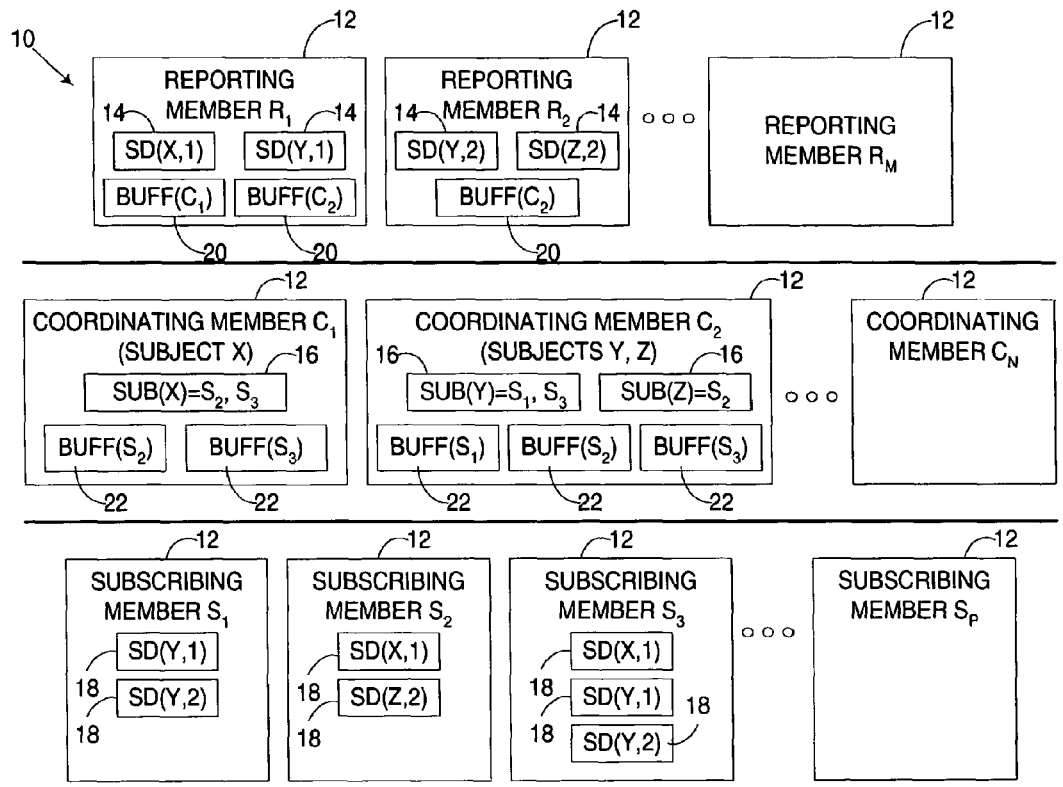
FIG. 1 is a block diagram of a distributed computing system incorporating a subscription-based distribution service consistent with the invention.

Turning to the Drawings, wherein like numbers denote like parts throughout the several views, FIG. 1 illustrates an exemplary distributed computing system 10 including a plurality of members 12 interconnected with one another in a distributed manner, e.g., via any combination of local area networks (LAN's), wide area networks (WAN's) and/or other networking topologies known in the art (not shown in FIG. 1). Individual members 12 may be physically located in close proximity with other members, or may be geographically separated from other members, as is well known in the art. Moreover, a wide variety of interconnection types, network types, member types, etc., may be permitted to coexist with one another in an efficient and reliable manner in distributed computing system 10.

In distributed computing system 10, members 12 cooperatively utilize a distributed service, referred to herein as a distribution service, to manage and distribute member-specific state data among the plurality of members. In this regard, members 12 may each be designated reporting members, coordinating members (or coordinators) and/or subscribing members, depending upon their roles in the system. Of note, while FIG. 1 illustrates members 12 partitioned into multiple reporting members $R_1$-$R_M$, multiple coordinating members $C_1$-$C_N$ and multiple subscribing members $S_1$-$S_P$, it will be appreciated that any given member can have multiple roles, and can even concurrently function as a reporting, coordinating, and subscribing member in some instances.

A reporting member, in this context, is a member that produces member-specific state data for distribution by the distribution service. A subscribing member is a member that consumes, or otherwise receives, the member-specific state data of another member.

A coordinating member is a member that manages the distribution of member-specific state data from one or more reporting members to one or more subscribing members. In the context of the invention, as noted above, the member-specific state data is characterized by one or more subjects.

A member in the distributed computing system has resident thereon at least a portion of the distribution service. A service, in this regard, corresponds to any program code as defined herein that is capable of supplying the requisite functionality. Furthermore, supported by the portion of the distribution service on a particular member are one or more services respectively implementing the functionality of a reporting member, a subscribing member and a coordinating member. Generally, for a particular member to function as a reporting member, a subscribing member and/or a coordinating member, the appropriate service corresponding to such functionality will be resident on that member. In many implementations, support for all three types of services will be provided on each member of the distributed computing system, irrespective of whether any particular member ultimately functions as more than one type of entity in a given environment. In other implementations, however, specific members may be configured to operate solely as one type of member, whereby in such implementations, only the services corresponding to that type of member need be incorporated into the portion of the distribution service resident on that member.

Consistent with the invention, coordinating members are responsible for managing the distribution of member-specific data associated with specific subjects, and as a result, reporting members are required to forward member-specific state data associated with a particular subject to the appropriate coordinating member for that subject. Furthermore, typically multiple coordinating members are supported at any given time to provide fault tolerance and scalability in the distributed computing system. In the illustrated embodiments, the forwarding of member-specific state data from a reporting member to a coordinating member takes the form of a post or other form of message.

Subscribing members in the illustrated embodiment subscribe to receive all member-specific state data associated with a particular subject. Put another way, subscribing members subscribe to particular subjects. As with communications between reporting members and coordinating members, communications from coordinating members to subscribing members typically take the form of messages.

A distribution service consistent with the invention is distributed in nature, typically including software components distributed among each member in the distributed computing system, with the components communicating, for example, via a peer-to-peer messaging protocol. In the illustrated embodiment, for example, it may be desirable to implement a distribution service within a group services messaging component supported by a clustering service, although other implementations may be used in the alternative.

FIG. 1, for example, illustrates the distribution of member-specific state data 14, resident in a plurality of reporting members $R_1$-$R_M$ to a plurality of subscribing members $S_1$-$S_P$, via a plurality of coordinating members $C_1$-$C_N$. In this example environment, three subjects are defined—subjects X, Y and Z. Coordinating member $C_1$ is assigned to manage subject X, while coordinating member $C_2$ is assigned to manage subjects Y and Z. Reporting member $R_1$ is shown with member-specific state data pertaining to subjects X and Y, designated as SD(X,1) and SD(Y, 1), while reporting member $R_2$ is shown with member-specific state data pertaining to subjects Y and Z, designated as SD(Y,2) and SD(Z,2).

Additionally maintained within each coordinating member is subscription information for each subject (designated at 16), representing which members are subscribed to receive member-specific state data for each subject. For subject X, subscribing members $S_2$ and $S_3$ are subscribed. Likewise, for subject Y, subscribing members $S_1$ and $S_3$ are subscribed, and for subject Z, only subscribing members $S_2$ is subscribed.

As a result of the subscription information stored in each coordinating member, any posts submitted by reporting members providing updates to member-specific state data associated with a particular subject are routed to the appropriate coordinating member, and then forwarded to the appropriate subscribing members as designated at 18. As such, since subscribing member $S_1$ is subscribed to receive subject Y, this member receives updates to the subject Y member-specific state data from reporting members $R_1$ and $R_2$. Likewise, subscribing member $S_2$ receives updates to the subject X and Z member-specific state data from reporting members $R_1$ and $R_2$, and subscribing member $S_3$ receives updates to the subject X and Y member-specific state data from reporting members $R_1$ and $R_2$.

As will become more apparent below, it may additionally be desirable to implement message buffering to combine updates to member-specific state data and reduce the size and/or frequency of messages communicated between members. In this regard, it may be desirable to maintain in each reporting member a coordinating member-specific message buffer 20 used to build messages for communication to a particular coordinating member. Similarly, it may be desirable to maintain in each coordinating member a subscribing member-specific message buffer 22 used to build messages for communication to a particular subscribing member. It will be appreciated that different buffer organizations may be utilized in the alternative, e.g., various integrations or partitioning of message buffers according to destination, subject, etc. Furthermore, the manner in which messages are constructed in a message buffer, e.g., to compile changes, retain complete copies of data and/or retain multiple posts from a given source, may vary in different embodiments. A more detailed discussion of the concept of buffering in the context of the invention will be discussed in greater detail below.

In general, in the illustrated embodiments, subjects are mapped to particular coordinating members. Whenever a reporting member changes its posts to subjects (i.e., its member-specific state data changes), it sends a message to the responsible coordinating member for the impacted subjects. Whenever a member subscribes to a subject, it sends the subscription request to the responsible coordinating member. The coordinating member's responsibility is then to manage the subjects which map to it and push any changes to any state data to any subscribing members.

Moreover, as will be discussed in greater detail below, if a coordinating member fails, all state data can typically be recovered from the surviving members, with each member sending its current posts and subscriptions to still-active coordinating members to enable such coordinating members to recover their respective states. A more detailed discussion of the recovery process is also described in greater detail below.

Figure 2:
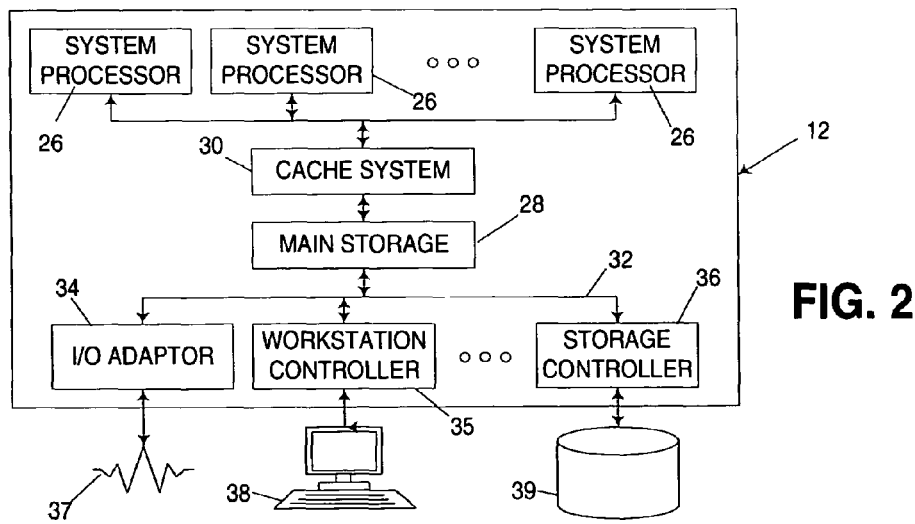
FIG. 2 is a block diagram of a node in the distrusted computing system of FIG. 1.

Now turning to FIG. 2, an exemplary hardware configuration for one of the members 12 in distributed computing system 10 is shown. Member 12 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). Indeed, various members 12 may be server computers participating in a cluster, while other members may be clients configured to access the cluster.

Member 12 generally includes one or more system processors 26 coupled to a main storage 28 through one or more levels of cache memory disposed within a cache system 30. Furthermore, main storage 28 is coupled to a number of types of external devices via a system input/output (I/O) bus 32 and a plurality of interface devices, e.g., an input/output adaptor 34, a workstation controller 35 and a storage controller 36, which respectively provide external access to one or more external networks 37, one or more workstations 38, and/or one or more storage devices such as a direct access storage device (DASD) 39. Any number of alternate computer architectures may be used in the alternative.

The discussion hereinafter will focus on the specific routines utilized to implement the above-described state data distribution system. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
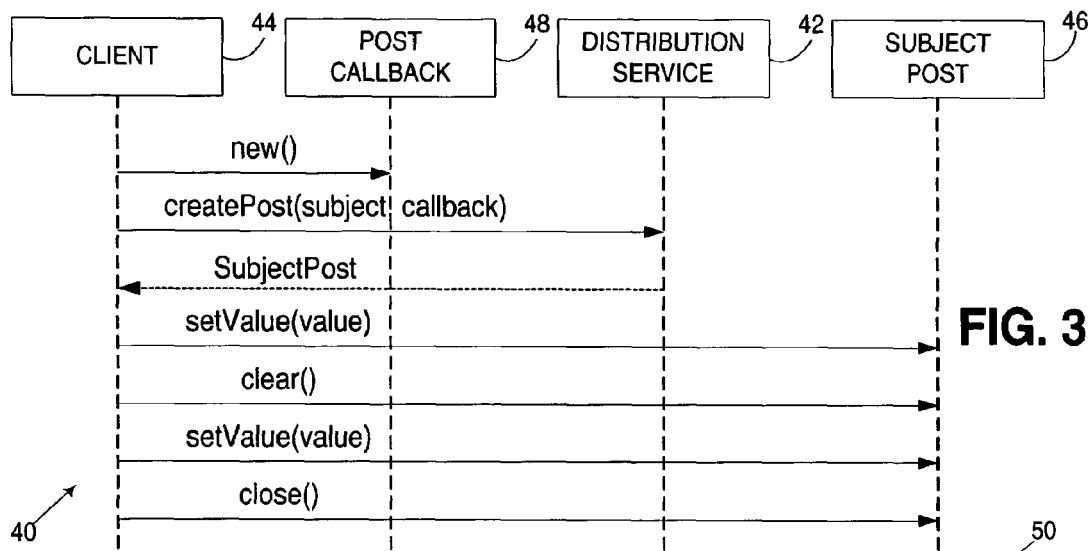
FIG. 3 is a call diagram illustrating a number of reporting-related calls supported by the distribution service of FIG. 1.
Figure 4:
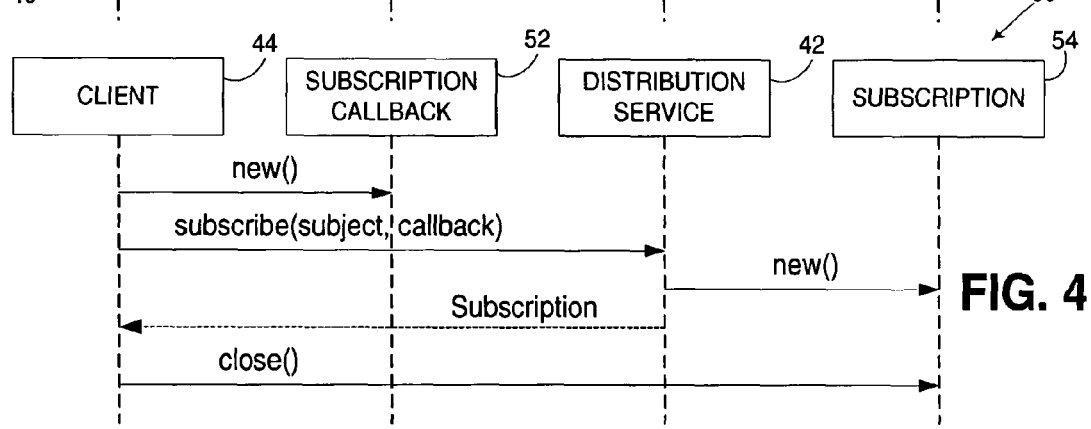
FIG. 4 is a call diagram illustrating a number of subscription-related calls supported by the distribution service of FIG. 1.
Figure 5:
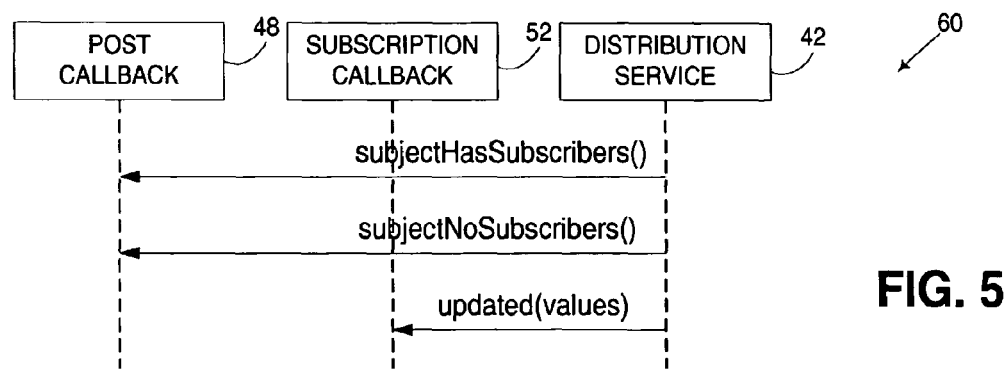
FIG. 5 is a call diagram illustrating a number of callback-related calls supported by the distribution service of FIG. 1.

Turning now to FIG. 3, an exemplary implementation of a distribution service consistent with the invention is illustrated in greater detail. Specifically, FIGS. 3-5 illustrate a number of calls supported by a distribution service in connection with posting member-specific state data, subscribing to receive member-specific state data, and distributing member-specific state data to subscribing members.

FIG. 3, in particular, illustrates at 40 several calls supported between a distribution service 42 and a client 44 in connection with creating and updating a subject post 46, illustrated at 40. Distribution service 42 may be implemented, for example, as a distributed messaging service supported in a clustered computing environment, where similar software is running on each member in the system, with messaging used to communicate between members. Other implementations, resident in whole or in part on various members of a distributed computing system, may be used in the alternative.

Client 44 is an entity that is a "client" from the perspective of the distribution service, e.g., a higher layer of software that is capable of calling distribution service API's. Given the calls in FIG. 3 are related to posting member-specific state data to the distribution service, client 44 is acting is this context as a reporting member, and is thus an entity or a surrogate therefor for which member-specific state data is being maintained.

Subject post 46 is an entity created by the distribution service to maintain member-specific state data on behalf of the client, and in this instance, member-specific state data associated with a particular subject.

Sequence 40 begins by client 44 creating a post callback entity 48 via a new( ) call, which is used as a conduit from distribution service 42 to client 44. Next, client 44 makes a createPost(subject, callback) call to distribution service 42, which results in the creation of subject post entity 46, which is associated with the subject identified in the call, and which is configured to notify the client of subscription information via the specified callback. The result of the call is the return of a handle to the subject post from distribution service 42 to client 44. Thereafter, client 44 is able to post member-specific state data associated with the subject to subject post 46 via a setValue(value) call, where value represents the member-specific state data of interest. As also illustrated in FIG. 3, client 44 may also remove the last post associated with a subject via a clear( ) call, as well as update the post with new member-specific state data via a setValue(value) call to subject post 46. Furthermore, should client 44 wish to remove the post from the distribution service, the client may do so via a close( ) call to subject post 46, which destroys the post entity. It will be appreciated that other calls may be supported consistent with the invention.

FIG. 4 next illustrates a sequence 50 utilized by a client 44 in subscribing to receive member-specific state data associated with a particular subject. In this instance, client 44 is acting on behalf of a subscribing member, which, as noted above, may also additionally function as a reporting member and/or a coordinating member in a distributing computing environment.

Client 44 establishes a new subscription first by creating a subscription callback entity 52 via a new( ) call. Subscription callback entity 52 is utilized by distribution service 42 as a conduit back to client 44.

Next, client 44 issues a subscribe(subject, callback) call to distribution service 42, which in turn results in the creation of a subscription entity 54 via a new( ) call by distribution service 42. Entity 54 is associated with the subject identified in the call, and is configured to notify a subscribing client of updates via the specified callback. Upon creation of subscription entity 54, distribution service 42 then returns a handle to subscription entity 54 to client 44. At a later point in time, should client 44 no longer wish to receive distributed member-specific state data associated with the particular subject for the subscription, client 44 may issue a close( ) call to subscription entity 54, thus terminating the subscription.

FIG. 5 next illustrates at 60 a number of callback-related calls supported by distribution service 42. For example, distribution service 42 supports subjectHasSubscribers( ) and subjectNoSubscribers( ) calls which are respectively used to notify a client via a post callback 48 that a particular subject does or doesn't have any members currently subscribed thereto. This information may be used by a client, for example, to determine whether to forward member-specific state data to the distribution service for a particular subject, as it may be unnecessary to distribute state data associated with subjects having no subscribers. Also, an additional callback-related call may be used by the distribution service to implement the distribution of member-specific state data to subscribing members. As shown in FIG. 5, for example, once a client 44 is subscribed to receive appropriate member-specific state data associated with a particular subject (e.g., via sequence 50 of FIG. 4), distribution service 42 is capable of returning updates to the member-specific state data via updated(values) calls to a subscription callback 52.

A number of different data structures may be used to store and distribute member-specific state data consistent with the invention. In one exemplary embodiment, for example, member-specific state data may be implemented as an array of objects, with each object storing a byte array representing the actual state data and having an interface providing a getPostingMember( ) method that returns the identity of the member providing the state data, a getvalue( ) method that returns the state data and a longGetVersion( ) method that returns the "version" of the post or state data, if versioning is supported. Other suitable data structures will be apparent to one of ordinary skill in the art having the benefit of the instant disclosure.

As noted above, the distribution of updated member-specific state data may be implemented in a number of manners consistent with the invention. For example, full copies of the member-specific state data may be forwarded to subscribing members, or in the alternative, deltas or changes to the state data maintained by a particular subscribing member may be sent. In addition, distribution service 42 may send data associated with a particular subject in a separate message from data associated with other subjects. In the alternative, data associated with all subjects subscribed to by a particular subscribing member may be forwarded in the same message. Other alternatives will be apparent to one of ordinary skill in the art having the benefit of the instant disclosure.

Figures 6, 7, 8:
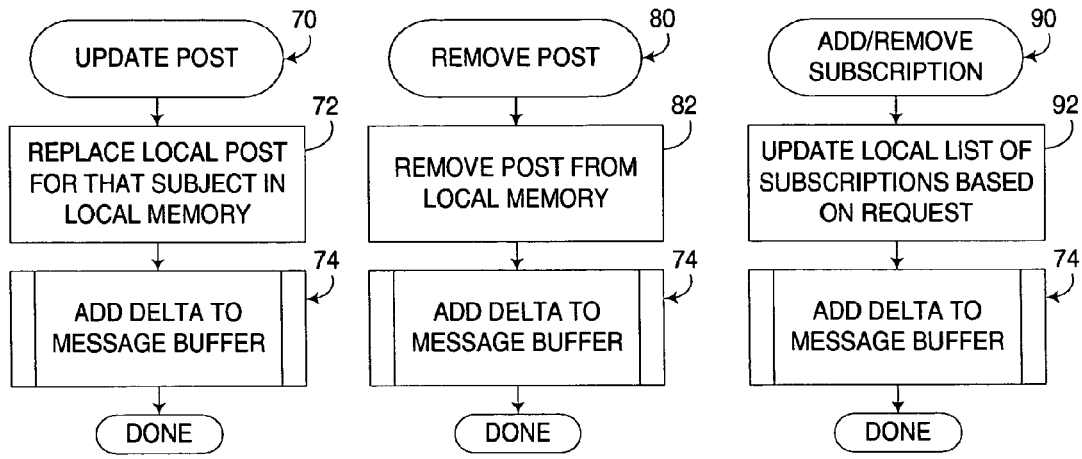
FIG. 6 is a flowchart illustrating the program flow of an update post routine called by a reporting member to update a subject post in the distribution service of FIG. 1.
FIG. 7 is a flowchart illustrating the program flow of a remove post routine called by a reporting member to remove a subject post in the distribution service of FIG. 1.
FIG. 8 is a flowchart illustrating the program flow of an add/remove subscription routine called by a subscribing member to add or remove a subscription in the distribution service of FIG. 1.

FIGS. 6-12 next illustrate a number of routines utilized in the aforementioned distribution service to implement the subscription-based distribution of member-specific state data as described herein. FIG. 6, for example, illustrates an update post routine 70 executed by the distribution service, and in particular upon a reporting member in a distributed computing system. Routine 70 is typically initiated by the setValue (value) call described above in connection with FIG. 3, and begins in block 72 by replacing the local post for the particular subject in the local memory of the reporting member. Thereafter, an add delta to message buffer routine 74 is called to merge the local post into the message buffer for subsequent distribution to subscribing members. Upon completion of routine 74, routine 70 is complete.

In addition, if versioning is supported, block 72 may additionally increment a version identifier and associate the new state data with the new version identifier. Associating version information with state data may be desirable, for example, to assist subscribing members with determining whether distributed state data represents a change from the locally-stored copy of such state data on the subscribing member. In such an embodiment, when a subscribing member receives member-specific state data from a coordinating member (e.g., via one of the messages sent in block 142, discussed below in greater detail in connection with FIG. 11), the subscribing member can compare the version information for the new state data with that already stored by the subscribing member, and simply discard the new state data if it is the same as that already stored by the subscribing member.

FIG. 7 illustrates a remove post routine 80, which is initiated via the close( ) call illustrated in FIG. 3, and which begins in block 82 by removing the post from local memory. Thereafter, add delta to message buffer routine 74 is called to merge the update into the buffered state data to be sent to the appropriate coordinator. Upon completion of routine 74, routine 80 is then complete.

FIG. 8 next illustrates an add/remove subscription routine 90, which is initiated by either a subscribe( ) or close( ) call as described above in connection with FIG. 4. Routine 90 begins in block 92 by updating a local list of subscriptions for the present member based upon the request. Thereafter, routine 74 is called to distribute this new subscription information to the appropriate coordinator. Upon completion of routine 74, routine 90 is complete.

Figure 9:
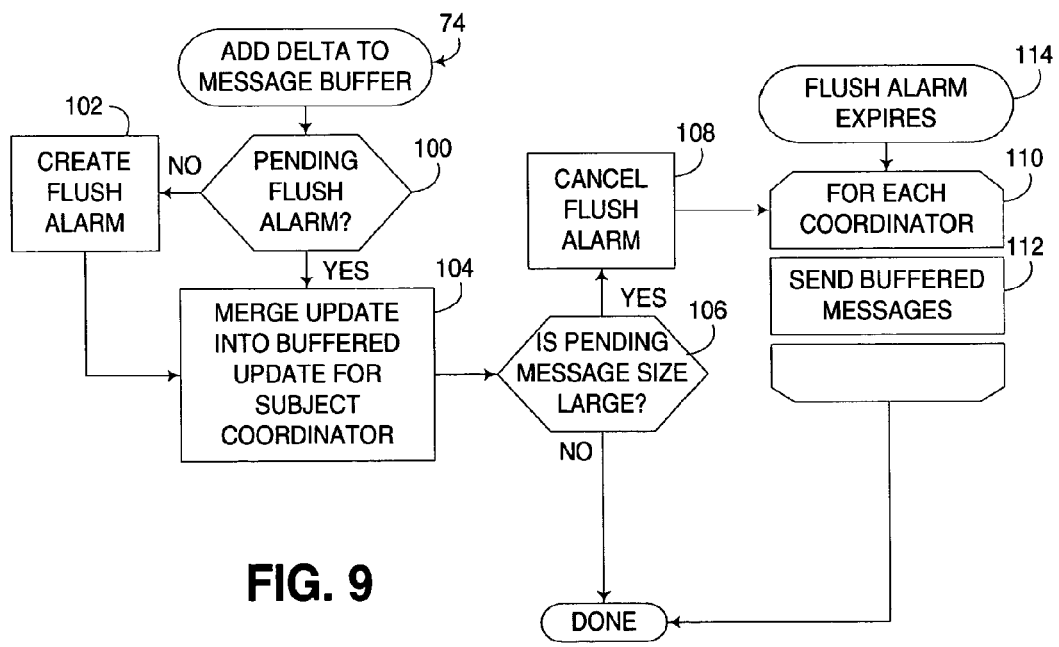
FIG. 9 is a flowchart illustrating the program flow of an add delta to message buffer routine referenced in FIGS. 6-9.

FIG. 9 illustrates add delta to message buffer routine 74 in greater detail. Routine 74 implements buffered messaging, which has the benefit of reducing the frequency and volume of data that must be transmitted between members in a distributed computing system. In particular, each member includes at least one message buffer that is utilized to temporarily store data to be transmitted to other members in the distributed computing system, including state data, as well as subscription information. Moreover, in the illustrated embodiment, buffers are utilized to store "delta" information, reflecting the changes to state data or subscription information, rather than a complete copy of updated data. In many instances, this minimizes the amount of data that must be transmitted between members, as each member is configured to utilize the delta information to modify its local copy of the information as appropriate. In other embodiments, however, complete updated data may be transmitted between members. Moreover, in some embodiments, buffering may be omitted, whereby any updates to any state data or subscription information are transmitted immediately to the appropriate members.

Routine 74 begins in block 100 by determining whether an alarm, referred to herein as a flush alarm, is currently pending. A flush alarm, in this context, is utilized to ensure that a buffer will be flushed, and all the data stored therein forwarded to the appropriate member in the distributed computing system, within a predetermined period of time (e.g., every 0.25 seconds). As will become more apparent below, it may also be desirable to monitor the amount of data in the buffer, and transmit the contents of the buffer to other members prior to the expiration of the flush alarm, so as to avoid overflowing a buffer.

If no flush alarm is currently pending, block 100 passes control to block 102 to a create the flush alarm. Thereafter, or if it is determined that a flush alarm is already pending in block 100, control passes to block 104 to merge the update into the updates already buffered in the message buffer for the coordinator of the impacted subject. In connection with this merge operation, the buffer is configured to store only the last post from a particular member with respect to a given subject. As such, if multiple posts arrive for the same subject from a given member before distribution to subscribing members, any earlier posts may be discarded, and therefore not transmitted to subscribing members. Thus, in instances where a particular reporting member may frequently update its member-specific state data for a particular subject, only the most recent update, reflecting the most recent state of the member, will be distributed to other members.

Upon completion of block 104, control passes to block 106 to determine whether the pending message size is large (i.e., greater than a predetermined threshold). If not, routine 74 is complete. Otherwise, control passes to block 108 to cancel the flush alarm, and then to block 110 to initiate a FOR loop which, for each coordinator in the system, executes block 112 to send a message including the buffered updates for such coordinator. In this regard, the messages may include member-specific state data and/or subscription information pertaining to a particular subject. Should a particular coordinator be responsible for coordinating multiple subjects, the updates relevant to each of the subjects may be combined into a single message, or alternatively, sent in separate subject-specific messages.

Upon completion of FOR loop 110, routine 74 is complete. Moreover, as noted at block 114, an alternative entry point into routine 74 occurs when the flush alarm expires. At such time, control passes to FOR loop 110 to forward messages to each of the coordinators. Thus, messages will be forwarded the earlier of the pending message size exceeding a threshold and expiration of the flush timer.

Figure 10:
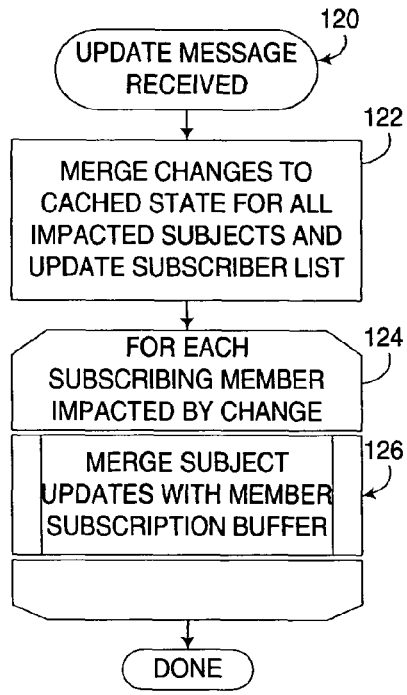
FIG. 10 is a flowchart illustrating the program flow of an update message received routine called by a coordinating member to process a received update message in the distribution service of FIG. 1.

FIG. 10 next illustrates an update message received routine 120 executed by a coordinating member in response to receipt of a message from a reporting or subscribing member via routine 74 of FIG. 9. Routine 120 begins in block 122 to merge the changes reflected in the message to the coordinating member's cache state for all impacted subjects, and to update its coordinating member's subscriber list, as appropriate. Next, a FOR loop 124 is initiated, which calls a merge subject updates with member subscription buffer routine 126 for each subscribing member impacted by the change.

Figure 11:
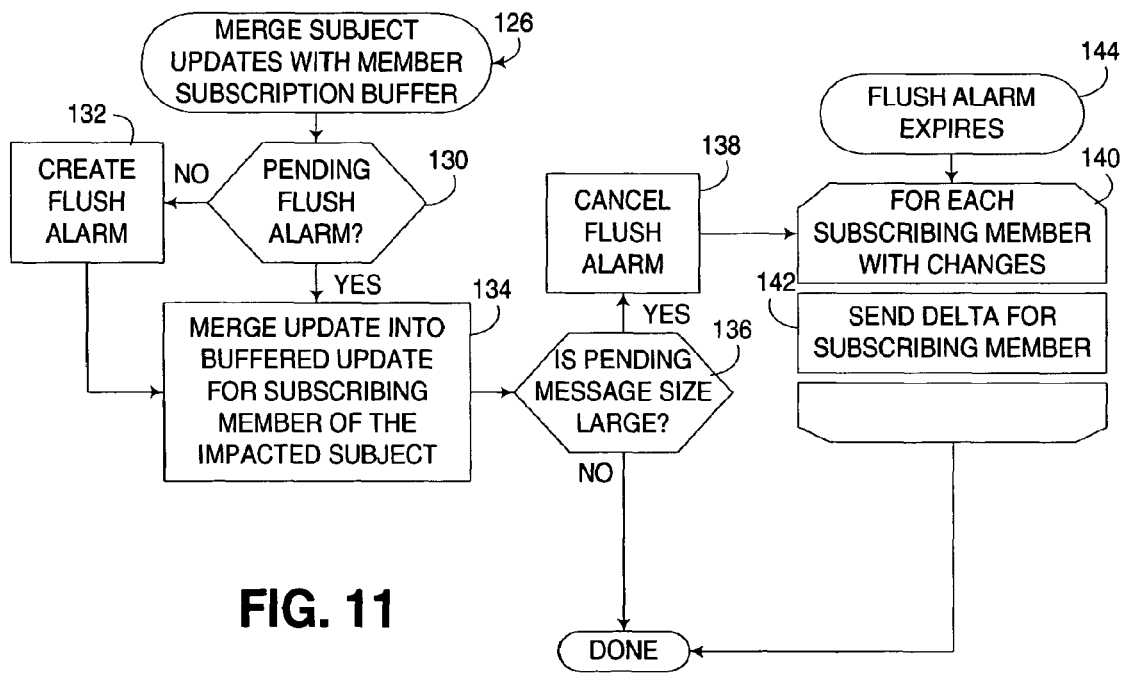
FIG. 11 is a flowchart illustrating the program flow of a merge subject updates with member subscription buffer routine referenced in FIG. 10.

Routine 126 is illustrated in greater detail in FIG. 11, and functions in many respects similarly to routine 74 of FIG. 9. Specifically, routine 126 relies on a flush alarm that ensures that updates are forwarded to subscribing members in the least at predetermined intervals, e.g., 0.25 seconds or another appropriate interval. Routine 126 begins in block 130 by determining whether a flush alarm is currently pending. If not, a flush alarm is created in block 132, and control then passes to block 134 to merge the update into the buffered updates for the subscribing member of the impacted subject. Returning to block 130, if a flush alarm is already pending, block 132 is bypassed, and block 130 passes control directly to block 134.

Block 134 then passes control to block 136 to determine whether the pending message size is large, i.e., greater than a predetermined threshold. If not, routine 126 is complete. Otherwise, control passes to block 138 to cancel the flush alarm, and then to pass control to a FOR loop 140 that executes block 142 for each subscribing member having changes. Block 142 sends the delta or change data appropriate for the subscribing member, thus enabling each subscribing member to update its local copy of the member-specific state data. Moreover, as discussed above, if versioning is used, the version of the state data may also be provided with the change data to allow the subscribing member to determine whether its local copy of the state data needs to be updated. Routine 126 is then complete. Moreover, as illustrated at block 144, an alternate entry point into block 126 is triggered when the flush alarm expires, whereby control is passed directly to FOR loop 140 to distribute the current contents of the buffers to the appropriate subscribing members.

Figure 12:
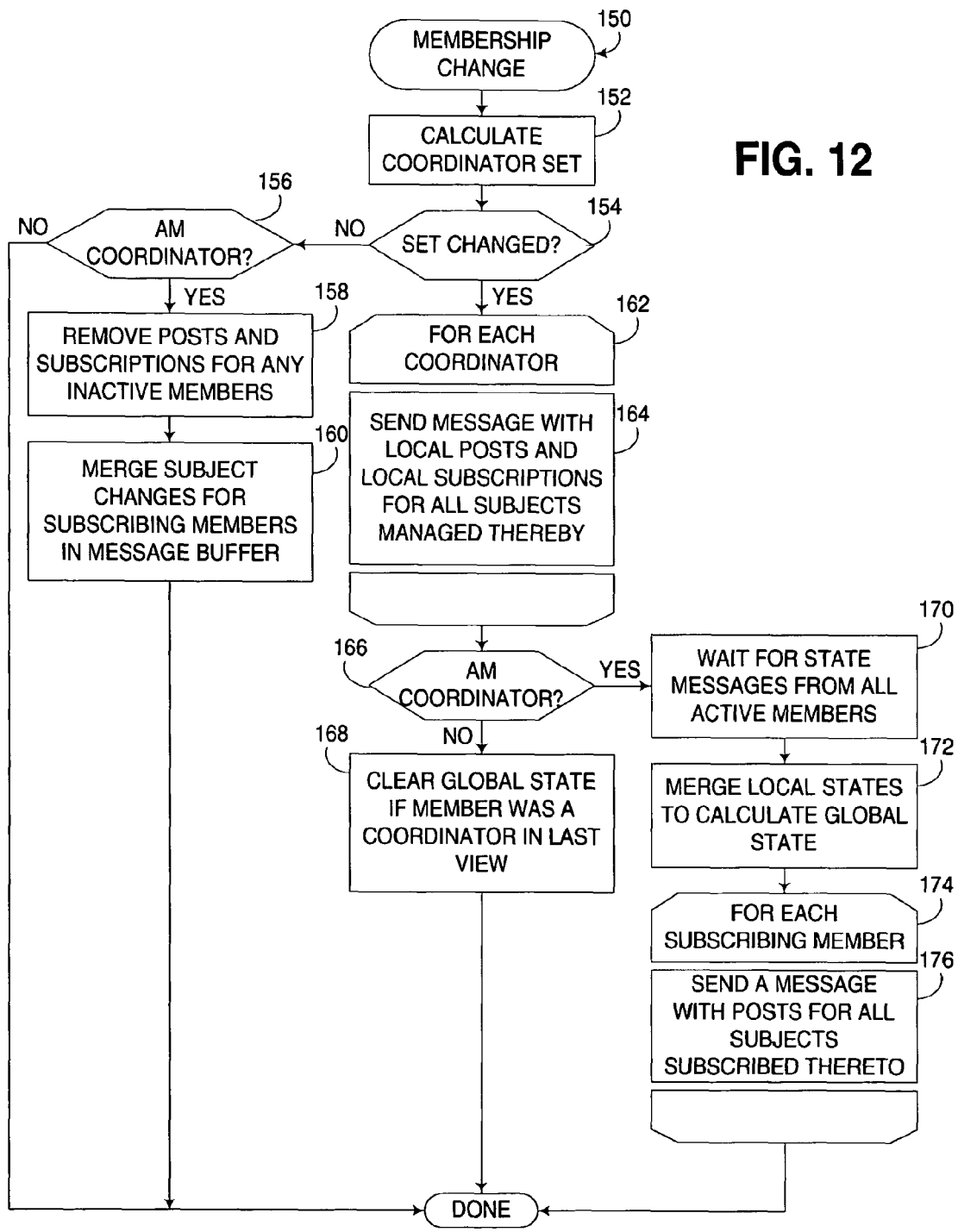
FIG. 12 is a flowchart illustrating the program flow of a membership change routine called by each member in the distribution service of FIG. 1 in response to a change in membership.

As noted above, one desirable aspect of the herein-described distribution service is the ability to accommodate failures in various members in a distributing computing system. FIG. 12, for example, illustrates an exemplary membership change routine 150 that may be executed in response to a change in membership in a distributed computing system. Routine 150 relies upon the concept of a "view," representing the set of online or active members at a given snapshot in time. A membership service, e.g., a conventional cluster membership service, may be used to track the status of members, and to generate additional views as members are added or removed from the system. It may be desirable in many embodiments to utilize ordered messaging and quality of service guarantees to ensure that activities that are initiated prior to a change in view are completed before the new view is established. Moreover, it may be desirable to utilize additional quality of service capabilities to ensure that if a message is delivered to one member, it will be delivered to all appropriate members, even in the event of a failure in the member that initiated the message prior to full distribution of the message.

It will be appreciated that other manners of tracking the status of members may be used in the alternative.

Routine 150 is typically initiated on each member of the distributed computing system in response to a membership change. As such, routine 150 may be initiated by a membership service upon detection of a change in membership by the service.

Routine 150 begins in block 152 by calculating the current coordinator set. Typically, block 152 is implemented such that each member is capable of calculating the same coordinator set independently of the other active members. For example, in one implementation, block 152 may sort all active members alphabetically, and choose a predetermined number of members from the end of the alphabetic list to be coordinators, with the number of members to be selected chosen by an administrator or system setting. In the alternative, it may be desirable to permit an administrator to select preferred members that should be included in a coordinator set if active. Other manners of calculating the desired coordinators to be selected from a given set of active members may be used in the alternative.

Next, block 154 determines whether the current coordinator set has changed as a result of the membership change. For example, block 154 may compare the coordinator set determined in block 152 with a prior coordinator set saved during a prior iteration of routine 150 (e.g., upon completion of the calculation in block 152 during the prior iteration).

If the coordinator set has not changed, control passes to block 156 to determine whether the member upon which routine 150 is executing is a coordinator. If not, no further activity is required, and routine 150 is complete.

If the current member is a coordinator, block 156 passes control to block 158 to remove any posts and subscriptions for any members determined to be inactive in the current view. Control then passes to block 160 to merge any subject changes for subscribing members in the appropriate message buffer. Upon completion of block 160, routine 150 is then complete.

Returning to block 154, if it is determined that the coordinator set has changed, control passes to block 162 to initiate a FOR loop to execute block 164 for each coordinator in the current coordinator set. For each such coordinator, block 164 sends a message including the local posts and local subscriptions on the current member for all subjects managed by the subject coordinator. By doing so, therefore, the current member is able to distribute its known member-specific state data, as well as its current subscription information, to the appropriate coordinators to enable the system-wide state to be recovered.

The manner in which a member determines which coordinators are responsible for which subjects may be performed in a number of manners consistent with the invention. For example, it may be desirable to implement a hash function on the subject name such that each member is capable of determining the appropriate coordinator independent of any other member based upon the given coordinator set at a given point in time. Various hashing algorithms may be utilized, including, for example, a buzz hash. Other manners of locally or remotely determining which coordinators are responsible for coordinating which subjects, e.g., various election processes, may be used in the alternative. For example, a directory service may be used to store a coordinator set.

Upon completion of FOR loop 162, control passes to block 166 to determine whether the current member is a coordinator. If not, control passes to block 168 to clear the global state on the member if it was determined that the member was a coordinator in the last view (i.e., if the member has now lost its coordinator status). The global state in this context is the combination of the member-specific state data provided by other members in association with the current member's prior status as a coordinator. Upon completion of block 168, routine 150 is complete.

Returning to block 166, if it is determined that the current member is a coordinator, control passes to block 170 to wait for state messages from all active members. As noted above, messages are forwarded from active members via FOR loop 162 being executed by other active members in the system.

Once all appropriate state messages have been received, control passes to block 172 to merge the local states forwarded by the various active members into a global state including all post and subscribers for each subject. Control then passes to block 174 to initiate a FOR loop which, for each subscribing member, executes block 176 to send a message to such subscribing member including the posts for all subjects subscribed to by the subscribing member. In this manner, each subscribing member is forwarded all of the member-specific state data for which that subscribing member is subscribed. Upon completion of block 176, routine 150 is complete. It will also be appreciated that upon completion of routine 150 on each active member, both the member-specific state data and subscription information will be consistent throughout the system.

It will be appreciated that various modifications may be made to the illustrated embodiments without departing from the spirit and scope of the invention. For example, in routine 150 of FIG. 12, a failure in a coordinator results in the rebuilding of states on all active members. In an alternative embodiment, it may be desirable to limit the rebuild of the global state to those members affected by the inactive coordinator. In particular, the subjects managed by the inactive coordinator may be mapped to other active coordinators, with the member-specific state data and subscription information rebuilt on the other coordinators. In this regard, it may be desirable to utilize an additional level of indirection in a hash function by implementing a table that maps particular hash buckets to particular coordinating members. Thus, when the coordinator set changes due to the failure of a given coordinator, the table may be referenced to determine what subjects are managed by that coordinator, with appropriate recovery actions performed to transition the management of such subjects to other coordinators. In such an instance, it may also be desirable to make the table fault tolerant to ensure that a consistent version of the table is maintained across all members, even in the event of a failure in one of the members.

Other modifications will be apparent to one of ordinary skill in the art. Therefore, the invention lies in the claims hereinafter appended.

What is claimed is:

1. An apparatus, comprising:
  a first member among a plurality of members participating in a distributed computing system, the first member including a memory and at least one processor; and
  a distribution service resident on the first member and configured to distribute member-specific state data within the distributed computing system, the distribution service configured to execute on the at least one processor, the distribution service configured to determine, for state data associated with each of a plurality of subjects, a coordinating member among a set of coordinating members from the plurality of members that is assigned to manage state data associated with a particular subject, the distribution service resident on the first member further including at least one of:
    a first service configured to forward member-specific state data maintained by the first member and associated with a first subject to the coordinating member assigned to manage state data associated with the first subject;
    a second service configured to request to subscribe to receive member-specific state data associated with a second subject and to thereafter receive such member-specific state data; and
    a third service configured to distribute member-specific state data associated with a third subject, the third service further configured to subscribe a second member to the third subject in response to a request received from the second member, and to thereafter distribute to the second member member-specific state data associated with the third subject and received from a third member;
  wherein the third service is configured to, subsequent to an update in the member-specific state data for the third member, receive updated member-specific state data from the third member, and distribute the updated member-specific state data from the third member to the second member.

2. The apparatus of claim 1, further comprising the second and third members, wherein the second and third members each include a memory and at least one processor, wherein the first, second and third members are in communication with one another over at least one network, and wherein the distribution service is further resident on each of the second and third members.

3. The apparatus of claim 1, wherein the updated member-specific state data distributed to the second member includes a complete copy of the member-specific state data.

4. The apparatus of claim 1, wherein the updated member-specific state data distributed to the second member includes change data used to modify a previous copy of the member-specific state data maintained in the second member.

5. An apparatus, comprising:
  a first member among a plurality of members participating in a distributed computing system, the first member including a memory and at least one processor; and
  a distribution service resident on the first member and configured to distribute member-specific state data within the distributed computing system, the distribution service configured to execute on the at least one processor, the distribution service configured to determine, for state data associated with each of a plurality of subjects, a coordinating member among a set of coordinating members from the plurality of members that is assigned to manage state data associated with a particular subject, the distribution service resident on the first member further including at least one of:
    a first service configured to forward member-specific state data maintained by the first member and associated with a first subject to the coordinating member assigned to manage state data associated with the first subject;
    a second service configured to request to subscribe to receive member-specific state data associated with a second subject and to thereafter receive such member-specific state data; and
    a third service configured to distribute member-specific state data associated with a third subject, the third service further configured to subscribe a second member to the third subject in response to a request received from the second member, and to thereafter distribute to the second member member-specific state data associated with the third subject and received from a third member;
  wherein the distribution service resident on the first member comprises each of the first, second and third services.

6. An apparatus, comprising:
  a first member among a plurality of members participating in a distributed computing system, the first member including a memory and at least one processor; and
  a distribution service resident on the first member and configured to distribute member-specific state data within the distributed computing system, the distribution service configured to execute on the at least one processor, the distribution service configured to determine, for state data associated with each of a plurality of subjects, a coordinating member among a set of coordinating members from the plurality of members that is assigned to manage state data associated with a particular subject, the distribution service resident on the first member further including at least one of:
- a first service configured to forward member-specific state data maintained by the first member and associated with a first subject to the coordinating member assigned to manage state data associated with the first subject;
- a second service configured to request to subscribe to receive member-specific state data associated with a second subject and to thereafter receive such member-specific state data; and
- a third service configured to distribute member-specific state data associated with a third subject, the third service further configured to subscribe a second member to the third subject in response to a request received from the second member, and to thereafter distribute to the second member member-specific state data associated with the third subject and received from a third member;
- wherein the distribution service is configured to determine a coordinating member by applying a hash function that maps the plurality of subjects to the set of coordinating members.

7. The apparatus of claim 6, wherein the distribution service is further configured to reapply the hash function subsequent to a change in the set of coordinating members to remap the plurality of subjects to the set of coordinating members.

8. An apparatus, comprising:
- a first member among a plurality of members participating in a distributed computing system, the first member including a memory and at least one processor; and
- a distribution service resident on the first member and configured to distribute member-specific state data within the distributed computing system, the distribution service configured to execute on the at least one processor, the distribution service configured to determine, for state data associated with each of a plurality of subjects, a coordinating member among a set of coordinating members from the plurality of members that is assigned to manage state data associated with a particular subject, the distribution service resident on the first member further including at least one of:
  - a first service configured to forward member-specific state data maintained by the first member and associated with a first subject to the coordinating member assigned to manage state data associated with the first subject;
  - a second service configured to request to subscribe to receive member-specific state data associated with a second subject and to thereafter receive such member-specific state data; and
  - a third service configured to distribute member-specific state data associated with a third subject, the third service further configured to subscribe a second member to the third subject in response to a request received from the second member, and to thereafter distribute to the second member member-specific state data associated with the third subject and received from a third member;
- wherein the distribution service is further configured to buffer member-specific state data prior to distributing the member-specific state data to another member.

9. The apparatus of claim 8, wherein the third service is further configured to, in response to receipt of member-specific state data from the third member, discard a previously buffered copy of the member-specific state data from the third member that is awaiting distribution to the second member.

10. The apparatus of claim 8, wherein the distribution service includes a timer, and wherein the distribution service is configured to forward buffered member-specific state data to another member in response to expiration of the timer.

11. The apparatus of claim 10, wherein the distribution service is further configured to forward buffered member-specific state data to another member prior to expiration of the timer based upon an amount of buffered data.

12. An apparatus, comprising:
- a first member among a plurality of members participating in a distributed computing system, the first member including a memory and at least one processor; and
- a distribution service resident on the first member and configured to distribute member-specific state data within the distributed computing system, the distribution service configured to execute on the at least one processor, the distribution service configured to determine, for state data associated with each of a plurality of subjects, a coordinating member among a set of coordinating members from the plurality of members that is assigned to manage state data associated with a particular subject, the distribution service resident on the first member further including at least one of:
  - a first service configured to forward member-specific state data maintained by the first member and associated with a first subject to the coordinating member assigned to manage state data associated with the first subject;
  - a second service configured to request to subscribe to receive member-specific state data associated with a second subject and to thereafter receive such member-specific state data; and
  - a third service configured to distribute member-specific state data associated with a third subject, the third service further configured to subscribe a second member to the third subject in response to a request received from the second member, and to thereafter distribute to the second member member-specific state data associated with the third subject and received from a third member;
- wherein the distribution service is further configured to determine a set of active members among the plurality of members, and in response to a change in the set of active members, determine whether the set of coordinating members among the plurality of members has changed, and if so, to recover a global state for the distributed computing system by, for each subject for which member-specific state data is maintained by the first member, communicating such member-specific state data to the coordinating member configured to distribute member-specific state data associate with such subject; and for each subject to which the first member is subscribed, communicating subscription information to the coordinating member configured to distribute member-specific state data associate with such subject.

* * * * *